Nov. 20, 1934.  D. A. QUARLES  1,981,664
METHOD OF PRESERVING POLES
Filed June 23, 1930
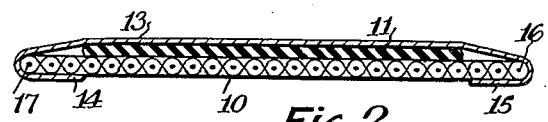
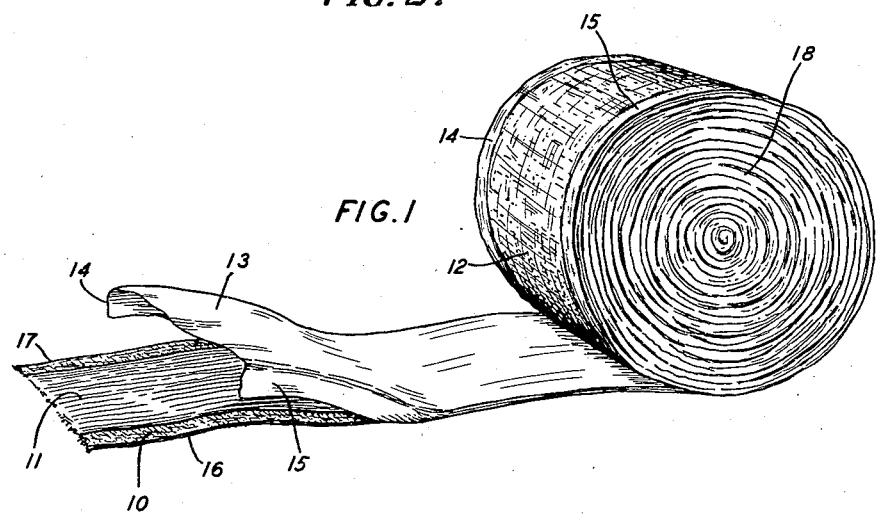
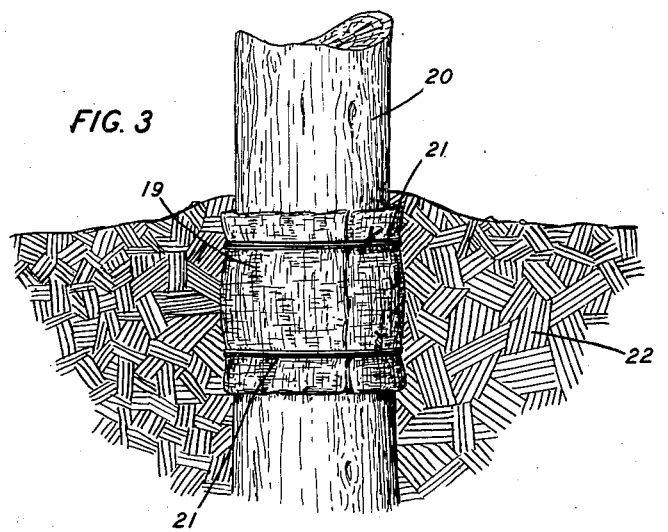
INVENTOR
D. A. QUARLES
BY J. MacDonald
ATTORNEY Patented Nov. 20, 1934

1,981,664

UNITED STATES PATENT OFFICE 1,981,664

METHOD OF PRESERVING POLES

Donald A. Quarles, Englewood, N. J., assignor to Bell Telephone Laboratories, Incorporated, New York, N. Y., a corporation of New York Application June 23, 1930, Serial No. 463,142

2 Claims. (Cl. 99—12)

This invention relates to a method of preserving telephone poles and the like and more particularly to a method of protecting such poles at the ground line.

The object of the present invention is to provide a suitable means for protecting poles at their vulnerable point by applying a preservative around the pole at the ground line.

Another object of the invention is to provide a suitable means for portecting poles which may be applied thereto after the poles are set in the ground.

A further object of the invention is to provide a method of applying the preservative which will be convenient and safe to handle.

It is a well known fact that telephone poles and the like, in fact any poles which are set in the ground, start to decay and disintegrate at the ground line. This is due to the fact that the most favorable conditions for the growth of fungi, the agents of decay, are found at the ground line.

Heretofore it has been the practice to protect poles and the like from the attack of wood destroying fungi by various methods of preservation. For example; the butts of the poles have been impregnated with various chemicals such as creosote oil and the like, such impregnation extending a short distance above the ground line. This method of treating poles entails considerable expense inasmuch as the poles must be concentrated at the treating plant and then transported back to the pole line site.

There are some methods, however, for treating poles, on the site where they are to be erected, which comprises portable apparatus for spraying a preservative such as creosote oil onto the pole or injecting the preservative into the pole. The spraying method has a disadvantage, however, in that the preservative does not penetrate into the pole sufficiently to preserve it over a long period of time, the penetration being in particular shallow when a green pole is sprayed. The methods of injecting the preservative into the pole are not very satisfactory, on account of difficulties with the mechanism and the large number of injections that must be made.

In certain localities it is quite unnecessary to treat the whole butt of the pole with creosote oil or the like, as the preservation of the pole from decay at the ground line, in accordance with my invention, assures it of adequate life.

My method of preservation of telephone poles at the ground line also provides a convenient and inexpensive way of treating poles after they have been set in the ground.

A recent method of preserving poles at the ground line has been the introduction of oxides of arsenic or other poisons in powdered or granular form into the ground which surrounds the pole, on the assumption that the preservative will be absorbed by the pole. This method has been found to be unreliable due to the fact that the absorption of the preservative into the fibers of the pole depends upon the presence of moisture.

With this throught in mind, I have devised a method of introducing a preserving agent around the ground line of a telephone pole which will not only be convenient and safe to handle but will overcome the aforementioned objections.

In accordance with my invention I secure to the pole at the ground line a strip of fabric, the inner surface of which is coated with the preservative. By applying the preservative to the pole in this manner a minimum amount of preserving material is used inasmuch as all of the preservative on the strip is in contact with the pole and there is little or no waste. In order that the strips of material with the preservative thereon may be conveniently handled I propose to coat long strips of material with the preservative and then roll the strips into convenient sized bales having a separating strip of paraffine paper or some other suitable material, between the succeeding layers of preservative and fabric.

The accompanying drawing illustrates the preferred form of my invention.

Fig. 1 is a perspective view showing the preservative on a strip of fabric and rolled into a bale with a separating strip of paraffine paper therebetween;

Fig. 2 is a view in cross-section taken at 2—2 of Fig. 1;

Fig. 3 is a view partly in section illustrating the manner in which the preservative is applied to a pole.

In accordance with Fig. 1, there is provided a length of fabric 10 having thereon a coating of preservative 11, the preservative being preferably in paste form and so applied that a margin of uncoated area is provided along the edges, 16 and 17. Interposed between the preservative 11 and the adjacent layers 12 of the fabric 10 is the strip of paper 13 which may be paraffined paper or some other suitable material. The paper 13 is folded over at the edges 14 and 15 and around the edges 16 and 17 of the fabric 10 (see Fig. 2), so that the preservative 11 will not be squeezed out when the fabric with its preservative thereon is rolled into the bale 18.

This provides a convenient way of handling the material since a strip, the proper length to encircle a pole, may be cut from the bale 18 without disturbing the balance of the material.

When it is desired to apply the protective "bandage" to a pole in accordance with the present invention, a strip the correct length to encircle the pole, is cut from the bale 18. The paper 13 is then removed, thus exposing the preservative 11. The strip of fabric 19 with the preservative 11 thereon is now wrapped snugly around the pole 20 with the preservative 11 in intimate contact therewith and secured thereto by some suitable means such as by means of the wires 21. The ground 22 is then piled around the base of the pole approximately to the level of the top of the "bandage".

It is readily apparent that this method of protecting poles is simple, efficient and convenient to practice inasmuch as the material is prepared at the factory and shipped to the pole line site in convenient sized bales.

I do not limit myself to the specific details shown as it is obvious that modifications of this method of preserving poles may be made by those skilled in the art and that I am not restricted to the specific example shown and am only limited by the scope of the appended claims.

What is claimed is:

1. A means for protecting wooden poles and the like comprising a strip of fibrous material, a layer of pasty preservative on said fibrous material, said preservative spaced away from the edge of said fibrous material, and a strip of moisture-proof paper overlying said preservative and extending a short distance on the underside of said fibrous material for maintaining said preservative in a moist condition, said paper being removed before the protective means is applied to the surface to be protected.

2. A means for protecting wooden poles and the like comprising a strip of fibrous material, a layer of pasty preservative on said fibrous material, and a strip of moisture-proof paper overlying said preservative and extending a short distance on the underside of said fibrous material for maintaining said preservative in a moist condition, said paper being removed before the protective means is applied to the surface to be protected.

DONALD A. QUARLES.